Figure 7:
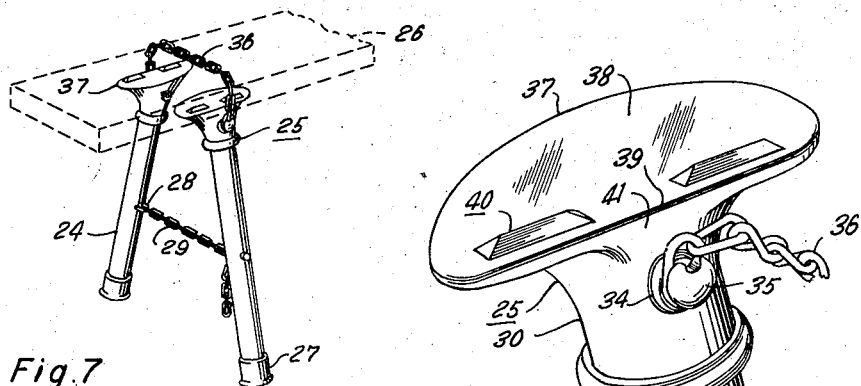

Feb. 17, 1959     JO W. TUCKER     2,874,004
PORTABLE TRESTLES
Filed Oct. 19, 1956     3 Sheets-Sheet 1
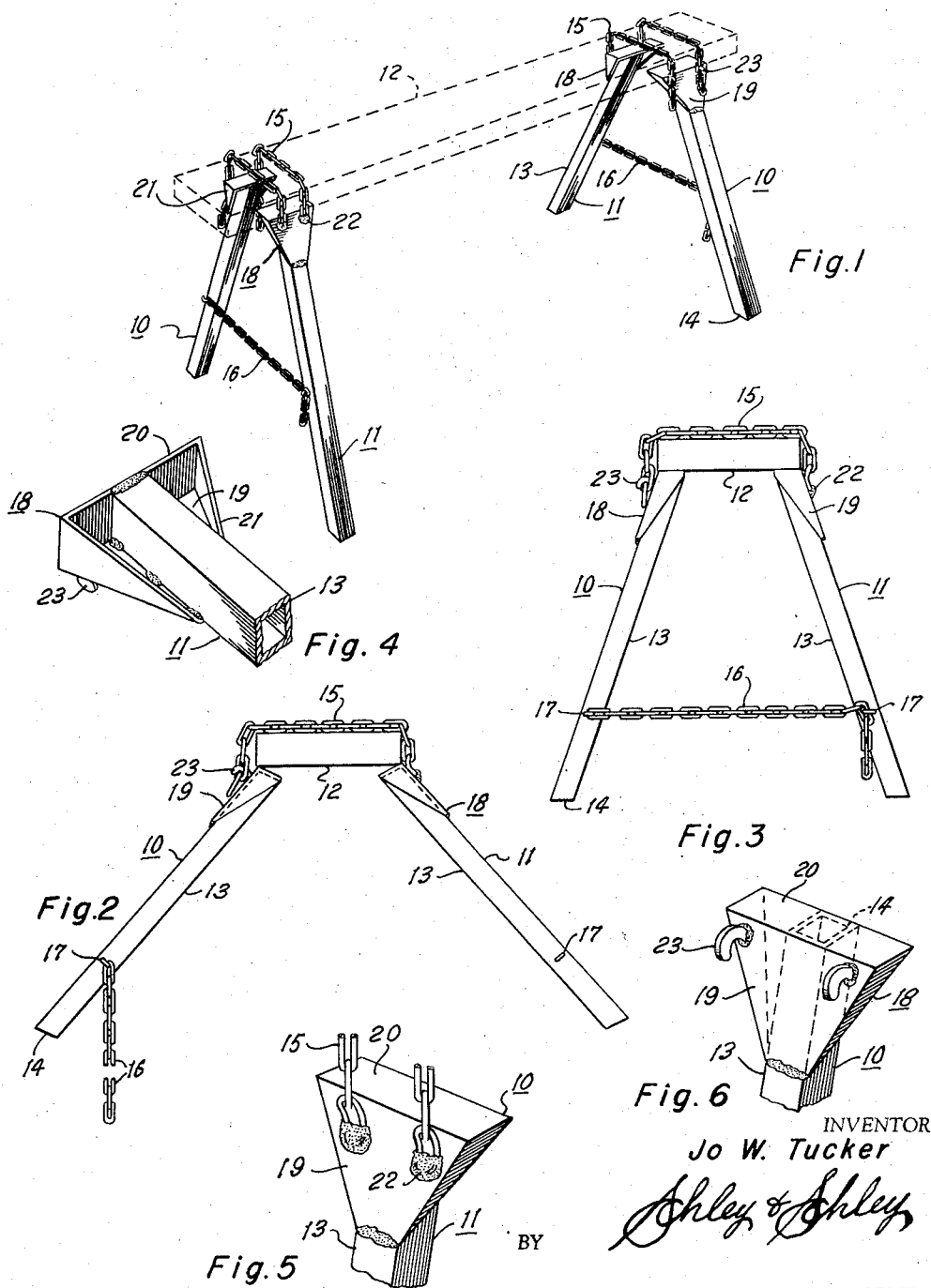
INVENTOR
Jo W. Tucker
BY Ashley & Ashley
ATTORNEYS Feb. 17, 1959  JO W. TUCKER  2,874,004
PORTABLE TRESTLES Filed Oct. 19, 1956  3 Sheets-Sheet 2

INVENTOR
Jo W. Tucker
BY Ashley & Ashley
ATTORNEYS

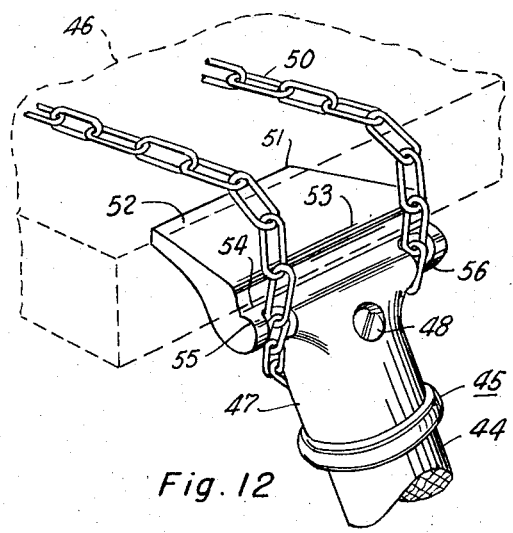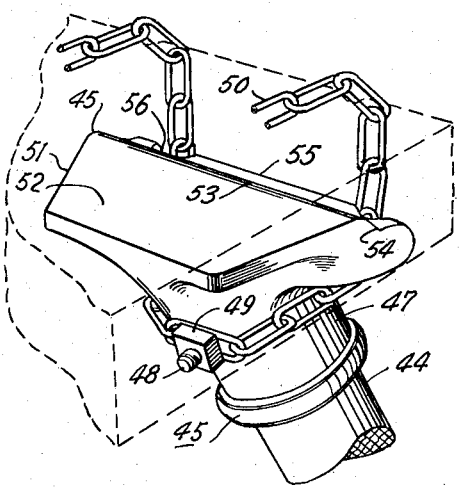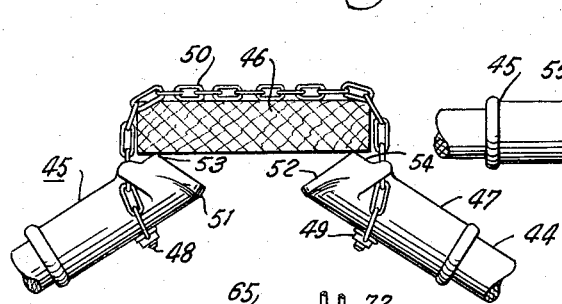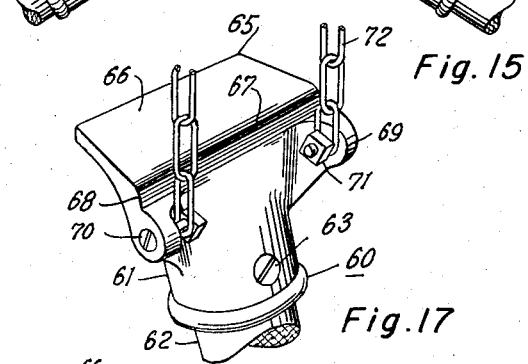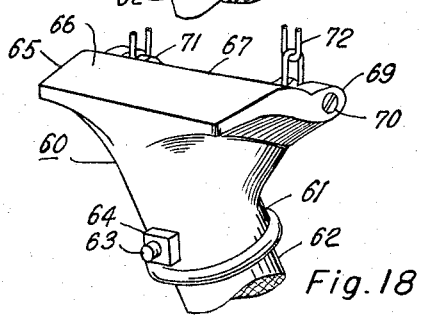

United States Patent Office 2,874,004
Patented Feb. 17, 1959

2,874,004

PORTABLE TRESTLES

Jo W. Tucker, El Paso, Tex.

Application October 19, 1956, Serial No. 617,115

5 Claims. (Cl. 304—5)

This invention relates to new and useful improvements in portable trestles.

One object of the invention is to provide improved portable means for clamping engagement with a horizontal member to connect legs thereto and form a trestle of the type used for supporting work or for reaching elevated work and which is readily detachable and compactable for carrying, transporting and storage.

A particular object of the invention is to provide an improved trestle having legs which are arranged in co-acting pairs for clamping engagement with a horizontal member and which are adjustably connected by flexible means whereby the thickness or width of the member may vary, the adjustable connecting means including a lower flexible element extending between the medial portions of each pair of legs and an upper flexible element extending between the upper end portions of the legs in overlying relation to said member whereby said legs are clamped in engagement with said member by spreading and then swinging the lower portions of said legs toward each other.

An important object of the invention is to provide an improved trestle, of the character described, wherein the legs are secured in position by frictional engagement with the underside of the horizontal member whereby a rigid connection between said legs and member is produced so as to prevent wobbling of said legs and permit movement of the trestle from place to place without displacement of said member.

Another object of the invention is to provide an improved trestle, of the character described, wherein the sole connection between the legs is by means of the flexible elements whereby said legs are readily detachable and quickly engageable with horizontal members of various thickness by merely connecting the flexible elements to said legs in accordance with such thickness.

A further object of the invention is to provide an improved trestle, of the character described, which includes brackets carried by the upper ends of the legs for connection with the upper flexible element and having amplified bearing surfaces for engagement with the underside of the horizontal member, together with means for engaging the margins of the longitudinal member to dispose the bearing surfaces inwardly of said margins whereby more positive fulcrums are provided for the inward swinging of said legs.

A construction designed to carry out the invention will be hereinafter described, together with other features of the invention.

Figure 8:
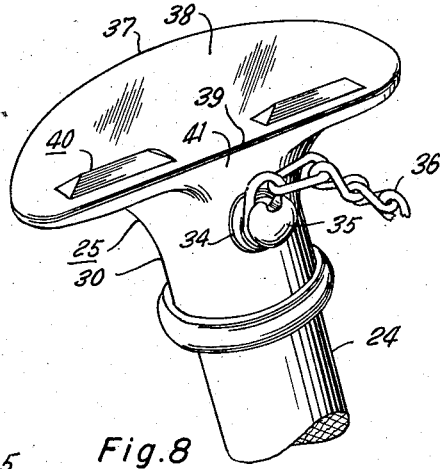
Figure 9:
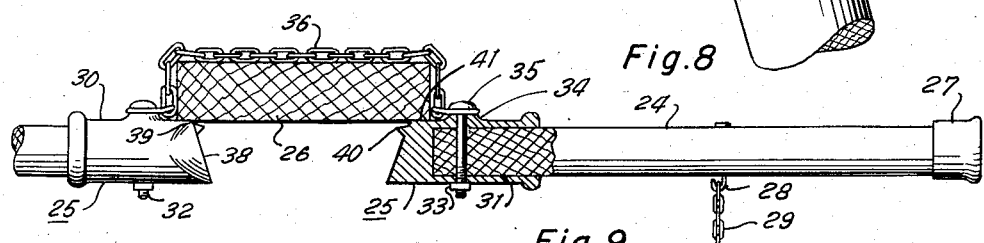
Figure 10:
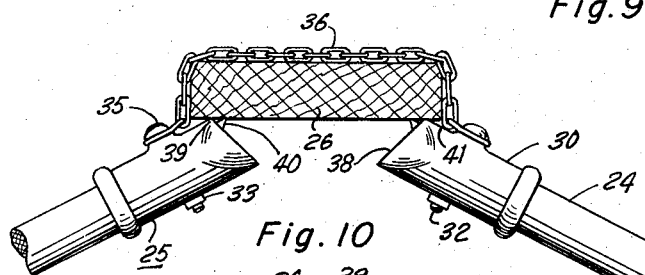
Figure 11:
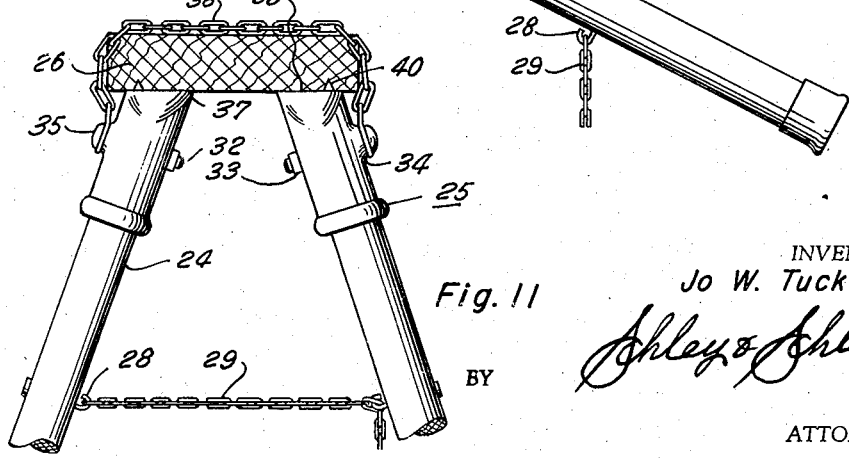

The invention will be more readily understood from a reading of the following specification and by reference to the accompanying drawings, wherein examples of the invention are shown, and wherein:

Fig. 1 is a perspective view of a trestle constructed in accordance with the invention with the horizontal member being shown in broken lines for clarity, Fig. 2 is an end elevational view of a pair of legs being engaged with a horizontal member, Fig. 3 is a view, similar to Fig. 2, showing the assembled trestle, Figs. 4, 5 and 6 are enlarged perspective views of the upper end portion of one of the legs, Fig. 7 is a perspective view of a pair of modified legs engaged with one end of a horizontal member shown in broken lines, Fig. 8 is an enlarged, perspective view of the upper end portion of one of the legs and its bracket, Figs. 9, 10 and 11 are enlarged, end elevational views, partly in section, showing the legs being engaged with the horizontal member, Figs. 12 and 13 are enlarged, perspective views of a modified bracket engaged with a horizontal member shown in broken lines, Figs. 14, 15 and 16 are end elevational views, partly in section, showing the engagement of a pair of the modified brackets with the horizontal member, Figs. 17 and 18 are enlarged, perspective views of another modified bracket.

In the drawings, the numerals 10 and 11 designate a pair of trestle legs adapted to support a horizontal member 12, which may be a wooden plank, board or other timber, to provide a trestle embodying the principles of the invention. It is noted that two or more pairs of legs may be provided, depending upon the length of the member 12. Preferably, each leg includes a hollow or tubular standard 13 which is square or rectangular in cross-section. In order to flatly engage the underside of the member 12 and the floor or ground (not shown) while in an inclined plane, the ends of each standard are bevelled in the usual manner as shown by the numeral 14.

Flexible elements 15 and 16 are provided for adjustably connecting the upper and medial portions of the legs 10 and 11 to each other and these elements may be in the form of chains. The lower element or chain 16 is adapted to be fastened to suitable hooks 17 carried by the medial portions of the standards 13. A bracket 18 is welded or otherwise secured to the upper end of each standard and includes a substantially triangular side plate 19 overlying the outer surface of the standard. The side plate 19 is inverted and has an upper margin of a length greater than the transverse dimension of the standard for connection with an enlarged, transverse head or top plate 20 which is elongated longitudinally of the member 12 to provide an amplified bearing surface for the bracket 18. Suitable triangular end plates or gussets 21 connect the ends of the top plate 20 to the inclined margins of the side plate so as to reinforce said top plate (Figs. 4, 5 and 6).

As shown, two upper flexible elements or chains 15 may be provided for each pair of legs. Preferably, the elements 15 are permanently fastened to the side plate 19 of one of the brackets 18 by welding or other suitable means 22. Hooks 23 are carried by the side plate of the bracket of the other leg of each pair of legs for detachable engagement with the flexible elements.

In connecting each pair of legs and brackets together for supporting the member 12, the chains or elements 15 are attached to the hooks 23 in accordance with the width or thickness of said member. Sufficient length is provided to permit the elements to overlie the top and sides of the member with the legs 10 and 11 spread as shown in Fig. 2. The legs are then swung toward each other so as to engage the top plates 20 of the brackets 18 with the underside of said member. Upon connecting the lower flexible element 16 with the hooks 17, the legs are held in the position shown in Figs. 3. It is noted that the top plate 20 is flat and in substantially flat engagement with the underside of the member since it conforms to the bevelled or inclined upper end 14 of the standard 13. The member is rigidly clamped between the overlying elements or chains and the heads 20 of the brackets so as to prevent wobbling of the legs and permit movement of the trestle formed by said member and legs as well as permit lifting and inverting of said trestle.

Although the legs and brackets are adapted to support the member with its greater transverse dimension in a horizontal plane, it is pointed out that said member may have its greater dimension disposed in a vertical plane or said member may be substantially square in cross-section. Also, it is noted that the adjustable connection of the legs and brackets by the flexible elements permits the width of the member to vary. In other words, the member may be of greater or lesser width than shown or it may be of varying width and have one end or portion narrower than the other end or remainder of said member. As a result, the legs and brackets are capable of being used with substantially any board or plank of sufficient strength to provide a rugged trestle for supporting work or for reaching elevated work, such as ceilings. Due to the detachable connection provided by the flexible elements, the legs and brackets may be readily disengaged for carrying, transporting or storage, as well as quickly assembled. The handling and storage of the legs and brackets are facilitated due to their compactness and lack of projections and permanent connections.

A preferred embodiment of the invention is shown in Figs. 7–11 and includes pairs of legs 24, similar to the legs 10 and 11, having brackets 25 at their upper ends for engagement with a horizontal member 26 which is similar to the member 12. Each leg 24 is preferably cylindrical and may have a conventional cap 27 on its lower end. Suitable hooks 28 are carried by the medial portions of the legs for connection by a chain or flexible element 29, similar to the lower element 16.

Each bracket 25 includes a depending shank 30 having a cylindrical socket 31 for receiving the upper end of one of the legs 24 which is fastened therein by a transverse bolt 32 and nut 33. If desired, the legs and brackets are readily detachable upon removal of the bolts 32 and nuts 33. A boss 34 is formed on the outer surface of the bracket in surrounding relation to the bolt which has its head 35 spaced from the boss for receiving therebetween the end link or one end of a chain or flexible element 36, similar to the upper elements 15. It is pointed out that the end links of the upper chain are rigidly confined against movement by the clamping engagement of the bosses 34 and bolt heads 35. As will be apparent, the length of the upper chain 36 varies in accordance with the width and thickness of the member 26.

An enlarged, transverse head or top plate 37 is formed on the upper end of each bracket 25 and is elongated longitudinally of the member 26 to provide an amplified, flat bearing surface 38 at its top for engagement with the underside of said member. It is noted that the bearing surface is inclined relative to the transverse axis of the leg so as to flatly engage the member when said leg is inclined.

As shown by the numeral 39, the outer, longitudinal margin or edge of the bearing surface 38 is rectilinear or straight, being substantially perpendicular to the bolt 32 and chain 36, and is bevelled or chamfered transversely (Fig. 8). A pair of elongated, pyramidal lugs or projections 40 extend longitudinally of the bearing surface in alined, spaced relationship and in parallel, spaced relation to the outer edge 39 for embedding in the underside of the member upon engagement of said bearing surface therewith. As shown by the numeral 41, the outer surface of the head 37 is flattened and extends at an obtuse angle from the edge 39 toward the boss 34 for bearing against the underside of the member 26 in parallel relationship upon initial engagement of said bracket with said member (Fig. 9).

The chain 36 is of sufficient length to extend around the top and sides of the member with its end links rigidly connected to the brackets 25 by the bolts 32 and the flattened surfaces 41 flatly engaging the underside of said member so that the bearing surfaces 38 and their outer edges 39 are disposed inwardly of the longitudinal margins of said member. As a result, the end links of the chain function as shoulders or stops for positioning the bearing surfaces and their outer edges relative to the member and, preferably, in equally-spaced relation to the margins of said member. The edges 39 function as fulcrums for the brackets 25 upon swinging of the legs 24 toward each other (Fig. 10) to insure snug engagement of the bearing surfaces 38 with the underside of the member and biting engagement of the chain 36 and lugs 40 with said member. The fastening of the chain 29 to the hooks 28 completes the connection of the legs and brackets to the horizontal member and the erection of a trestle in accordance with the invention (Fig. 11).

Another modification is shown in Figs. 12–16 and includes similar legs 44, brackets 45 and horizontal member 46. Each bracket 45 has a similar shank 47 and is connected to one of the legs 44 by a transverse bolt 48 and a nut 49 at the inner end of the bolt. A chain or flexible element 50, which is shown as being endless, is looped around each shank and has a link confined upon each bolt 48 by its nut 49 at the inner surface of the shank, whereby the chain is doubled and two lengths thereof overlie the member 46 in the manner of the elements 15. An enlarged, transverse head or top plate 51, similar to the head 37, is provided at the upper end of each bracket and includes a similar, amplified, flat bearing surface 52 and outer edge 53 which functions as a fulcrum for the bracket (Fig. 15). Below the outer edge 53, the head 51 has a coextensive, flattened surface 54 depending at an obtuse angle from said edge for initial engagement with the underside of the member in parallel relationship (Fig. 14) and an outwardly extending shoulder 55 is formed therebelow for engaging the margin of said member to position the bearing surface 52 and outer edge inwardly of said margin. Since the shoulder 55 extends throughout the length of the head, notches 56 are cut in the end portions thereof to accommodate the chain 50 (Figs. 12 and 13) which bites into the member upon swinging of the legs 44 toward each other (Fig. 16).

A slightly modified bracket 60 is shown in Figs. 17 and 18 and includes a substantially identical shank 61 connected to a leg 62 by a transverse bolt 63 and nut 64. A similar head or top plate 65 is formed on the upper end of the bracket and has a similar bearing surface 66, outer edge 67 and outer flattened surface 68. Instead of the coextensive shoulder 55, an ear or lug 69 extends outwardly from each end portion of the head 65 below the flattened surface 68 and carries a transverse bolt 70 and nut 71 for connection with one end of a pair of chains or flexible elements 72, similar to the elements 15. It is noted that the lugs 69 serve the same purpose as the shoulder 55 and that the brackets 45 and 60 function in the same manner as the brackets 25. Although these brackets are detachably connected to their respective legs, when so connected, each bracket forms a part of its leg. In fact, the brackets 25, 45 and 60 could be permanently attached to their legs in a manner similar to the brackets 18 and their standards 13.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a portable trestle, a pair of legs adapted to support a horizontal member, a bracket at the upper end of each leg and having a head for bearing against the underside of the member, an upper flexible element having connection with the brackets and adapted to overlie the member, and a lower flexible element for connecting the medial portions of the legs for holding the upper element and brackets in engagement with the member when said legs are swung toward each other.

2. In a portable trestle as set forth in claim 1, shoulder means on each bracket below its head for engagement with the longitudinal margin of the member to dispose the head inwardly of the margin whereby said head bears against the underside of the member inwardly of its longitudinal margin when the legs are swung inwardly relative to the member.

3. In a portable trestle as set forth in claim 1 wherein the head of each bracket is elongated longitudinally of the member to provide an amplified bearing surface for engagement with the underside of the member.

4. In a portable trestle as set forth in claim 3, shoulder means on each bracket below its bearing surface for engagement with the longitudinal margin of the member to dispose the bearing surface inwardly of the margin whereby said surface bears against the underside of the member inwardly of its longitudinal margin when the legs are swung inwardly relative to the member.

5. In a portable trestle as set forth in claim 4, fulcrum means on each head between its bearing surface and the shoulder means for engaging the underside of the member inwardly of its longitudinal margin during inward swinging of the legs to positively position the bearing surface.

References Cited in the file of this patent

UNITED STATES PATENTS

| | | |
|---|---|---|
| 381,510 | Rush | Apr. 17, 1888 |
| 737,000 | Mortimer | Aug. 25, 1903 |
| 1,685,283 | Gibson | Sept. 25, 1928 |
| 1,726,662 | Goff | Sept. 3, 1929 |
| 2,419,778 | Imes | Apr. 29, 1947 |

FOREIGN PATENTS

| | | |
|---|---|---|
| 47,538 | Sweden | Feb. 21, 1918 |